(12) United States Patent
Lee et al.

(10) Patent No.: US 9,030,662 B2
(45) Date of Patent: May 12, 2015

(54) METHOD AND APPARATUS FOR PROCESSING OPTICAL SIGNAL OF SPECTROMETER USING SPARSE NATURE OF SIGNALS

(71) Applicant: Gwangju Institute of Science and Technology, Buk-gu, Gwangju (KR)

(72) Inventors: Heung No Lee, Gwangju (KR); Sang Jun Park, Gwangju (KR); James Oliver, Gwangju (KR); Woong Bi Lee, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 0 days.

(21) Appl. No.: 13/711,930

(22) Filed: Dec. 12, 2012

(65) Prior Publication Data

US 2014/0022548 A1    Jan. 23, 2014

(30) Foreign Application Priority Data

Jul. 20, 2012   (KR) .......................... 10-2012-0079171

(51) Int. Cl.
*G01N 21/25* (2006.01)
*G01J 3/51* (2006.01)
*G01J 3/28* (2006.01)
*G01J 3/36* (2006.01)

(52) U.S. Cl.
CPC .. *G01J 3/51* (2013.01); *G01J 3/513* (2013.01); *G01J 3/28* (2013.01); *G01J 3/36* (2013.01)

(58) Field of Classification Search
CPC .................................... G01J 3/51; G01J 3/513
USPC .......................................................... 356/402
See application file for complete search history.

(56) References Cited

U.S. PATENT DOCUMENTS

2010/0182598 A1 *   7/2010   Choi et al. .................... 356/323

OTHER PUBLICATIONS

Chang, Cheng-Chun, Nan-Ting Lin, Umpei Kurokawa, and Byung Il Choi. "Spectrum reconstruction for filter-array spectrum sensor from sparse template selection." Optical Engineering 50, No. 11 (2011): 114402-1.*
Chang, Cheng-Chun and Lee, Heung-No, "On the estimation of target spectrum for filter-array based spectrometer." Optices Express, vol. 16, Issue 2, pp. 1056-1061 (2008).*

(Continued)

*Primary Examiner* — Tri T Ton
*Assistant Examiner* — Willie Merrell, II
(74) *Attorney, Agent, or Firm* — Nath, Goldberg & Meyer; Joshua B. Goldberg; Katelyn J. Bernier

(57) ABSTRACT

An apparatus for processing an optical signal of a spectrometer using sparse nature of a signal spectrum is provided including an optical filter array configured to filter an incident light, an optical sensor array configured to convert the filtered light into charges and a digital signal processing unit configured to perform a digital signal processing on an output from the optical sensor array on the basis of an L1 norm minimization algorithm using sparse nature of a signal spectrum and recover spectrum information of the incident light.

10 Claims, 3 Drawing Sheets

(56) References Cited

OTHER PUBLICATIONS

Kim, Seung-Jean, Kwangmoo Koh, Michael Lustig, Stephen Boyd, and Dimitry Gorinevsky. "An Interior-Point Method for Large-Scale $l_1$-Regularized Least Squares." Selected Topics in Signal Processing, IEEE Journal of 1, No. 4 (2007): 606-617.*

Oliver, J. et al., Improving Resolution of Miniature Spectrometers by Exploiting Sparse Nature of Signals "2011 Optical Society of America" 11 pages.

* cited by examiner

METHOD AND APPARATUS FOR PROCESSING OPTICAL SIGNAL OF SPECTROMETER USING SPARSE NATURE OF SIGNALS

CROSS-REFERENCE TO RELATED APPLICATION

This application claims priority to Korean Patent Application No. 10-2012-0079171 filed on 20 Jul. 2012 and all the benefits accruing therefrom under 35 U.S.C. §119, the contents of which are incorporated by reference in their entirety.

BACKGROUND

The present invention disclosed herein relates to a method and an apparatus for processing an optical signal of a spectrometer using sparse nature of a signal spectrum, and more particularly, to a method and an apparatus for processing an optical signal of a spectrometer using sparse nature of a signal spectrum in which high resolution can be achieved by finding unknown spectrum information based on previously known spectrum information using a digital signal processing (DSP) technique, even with to a small number of filters in an optical filter array compared to an optical wavelength band.

A spectrometer is used as an essential instrument in various industrial fields of optics, chemistry, oceanics, and the like. The spectrometer measures intensities at various wavelengths of light from an object and shows the same in graph or a spectrum form. A degree of how precisely the spectrometer shows spectral information about an object is called resolution.

A small spectrometer among the spectrometers adopts a filter array in order to reduce cost. The filter array indicates a structure produced with filters intensively arranged at one point.

A filter array technique adopting a nano process can minimize a size of the spectrometer, thereby enabling mass production and production cost reduction. A small spectrometer produced by this process is greatly helpful in measuring feature of an object in the industrial field outside the laboratory. The small spectrometer can also be used in easy connection with a computer or other electronic devices. In addition, a filter array based spectrometer has an advantage of measuring spectrum information of an optical source in a short time.

Since the limit of resolution in the spectrometer is determined by the number of filters in the optical filter array, however, it is necessary to increase the number of filters or develop a new device for increasing the resolution.

In the small spectrometer, there occur problems that the spectrum information is distorted due to reductions in the number of filters on which the resolution depends. Accordingly the spectrum information obtained from the spectrometer gets significantly distorted so that the original spectrum information of the optical signal cannot be accurately obtained.

SUMMARY

The present invention provides a method and an apparatus for processing an optical signal in a spectrometer by exploiting sparse nature of a signal spectrum and thereby can achieve high resolution by obtaining unknown spectrum information based on previously known spectrum information using a digital signal processing technique, even though the input spectrum information is insufficient due to a small number of filters in an optical filter array compared to an optical wavelength band in the spectrometer.

In accordance with an exemplary embodiment of the present invention, an apparatus for processing an optical signal of a spectrometer using sparse nature of a signal spectrum includes an optical filter array configured to filter an incident light; an optical sensor array configured to convert the filtered light into charges; and a digital signal processing unit configured to perform a digital signal processing on an output from the optical sensor array on the basis of an L1 norm minimization algorithm using sparse nature of a signal spectrum and recover spectrum information of the incident light.

The digital signal processing unit may be implemented as a Digital Signal Processing chip.

The L1 norm minimization algorithm may perform a process which models underdetermined linear equations of primal variables, models underdetermined linear equations of dual variables corresponding to the underdetermined linear equations of the primal variables, and calculates a unique solution from the modeled underdetermined linear equations of the dual variables.

The underdetermined linear equations of dual variables model a sparse signal of the output from the optical sensor array that has a non-negative limitation.

The L1 norm minimization algorithm may perform a process which sets initial values of primal variables, dual variables and repeated indices, calculates directional vectors, calculates a step size, updates the primal and dual variables, and determines whether a duality gap is equal to or less than a reference value, repeats increasing an index by 1 and calculating a directional vector or updating the primal and dual variables when the duality gap is larger than the reference value, or outputs an estimate as an optical spectrum estimation value when the duality gap is equal to or less than the reference value.

In accordance with another exemplary embodiment of the present invention, a method of processing an optical signal of a spectrometer using sparse nature of a signal spectrum, includes: filtering an incident light using an optical filter array; converting the filtered light into charges using an optical sensor array and outputting the converted charges; and performing a digital signal processing on an output from the optical sensor array on the basis of an L1 norm minimization algorithm using sparse nature of a signal spectrum through a digital signal processing unit and recovering spectrum information of the incident light.

The L1 norm minimization algorithm may include a process which models underdetermined linear equations of primal variables, models underdetermined linear equations of dual variables corresponding to the underdetermined linear equations of the primal variables, and calculates a unique solution from the modeled insufficient linear equations of the dual variables.

The underdetermined linear equations of dual variables models a sparse signal of the output from the optical sensor array that has a non-negative limitation.

The L1 norm minimization algorithm may include a process which sets initial values of primal variables, dual variables and repeated indices, calculates directional vectors, calculates a step size, updates the primal and dual variables, and determines whether a duality gap is equal to or less than a reference value, repeats increasing an index by 1 and calculating a directional vector or updating the primal and dual variables when the duality gap is larger than the reference value, or outputs an estimate as an optical spectrum estimation value when the duality gap is equal to or less than the reference value.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
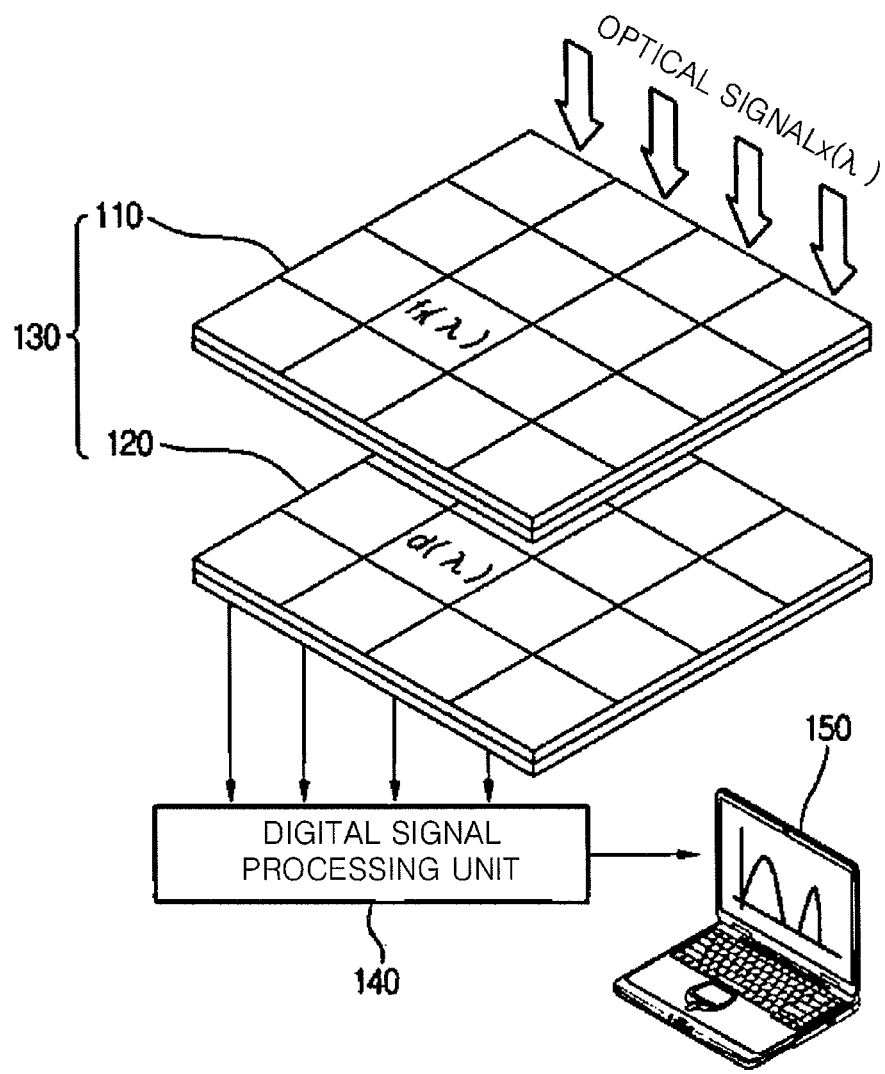
FIG. 1 is a diagram illustrating a configuration of an optical signal processing apparatus in a small spectrometer using sparse nature of a signal spectrum in accordance with an exemplary embodiment of the present invention.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the figures, the dimensions of elements are exaggerated for clarity of illustration. Like reference numerals refer to like elements throughout.

FIG. 1 is a configuration diagram illustrating an optical signal processing apparatus in a small spectrometer using sparse nature of a signal spectrum in accordance with an exemplary embodiment of the present invention.

Referring to FIG. 1, the optical signal processing apparatus includes an optical filter array 110, an optical sensor array 120, a digital signal processing unit 140 and an analysis information providing unit 150.

The optical filter array 110 may be configured of an aggregation of fixed filters having different transmission functions. The filter array 110 may be configured of M filters arranged in a 2-dimensional type. Each filter configuring the optical filter array 110 transmits only wavelength components of a narrow bandwidth. The optical filter array 110 can be manufactured in a nano-process.

On the other hand, the optical filter array 110 may not have an ideal transmission function, but have a wavelength selective transmission function. Accordingly spectrum information obtained from the optical filter array 110 may include distorted information of which original spectrum information of an optical signal is distorted.

The optical sensor array is disposed in a lower end portion of the optical filter array 110 and converts the filtered light into charges. The optical sensor array 120 may be configured of for example, a charged coupled device (CCD) array. Each filter of the optical filter array 110 is connected to each element of the optical sensor array 120, so that optical signals having passed through the optical filter array 110 are converted into charges. A configuration including the filter array 110 and optical sensor array 120 is called a spectral detector 130. As shown in FIG. 1, the optical sensor array is directly connected to the digital signal processing unit. An output of the optical sensor array 120 is sampled and input to the digital signal processing unit 140 for spectrum estimation.

The digital signal processing unit 140 performs digital signal processing in order to recover the original spectrum information of the optical signal from the obtained spectrum signal distorted through the optical filter array 110 and optical sensor array 120. The digital signal processing unit 140 may be implemented with a DSP chip.

The analysis information providing unit 150 provides the recovered spectrum information of the optical signal in a graph or other analysis information. For example, the analysis information providing unit 150 may be a microprocessor having software providing the analysis information therein or a computer.

Figure 2:
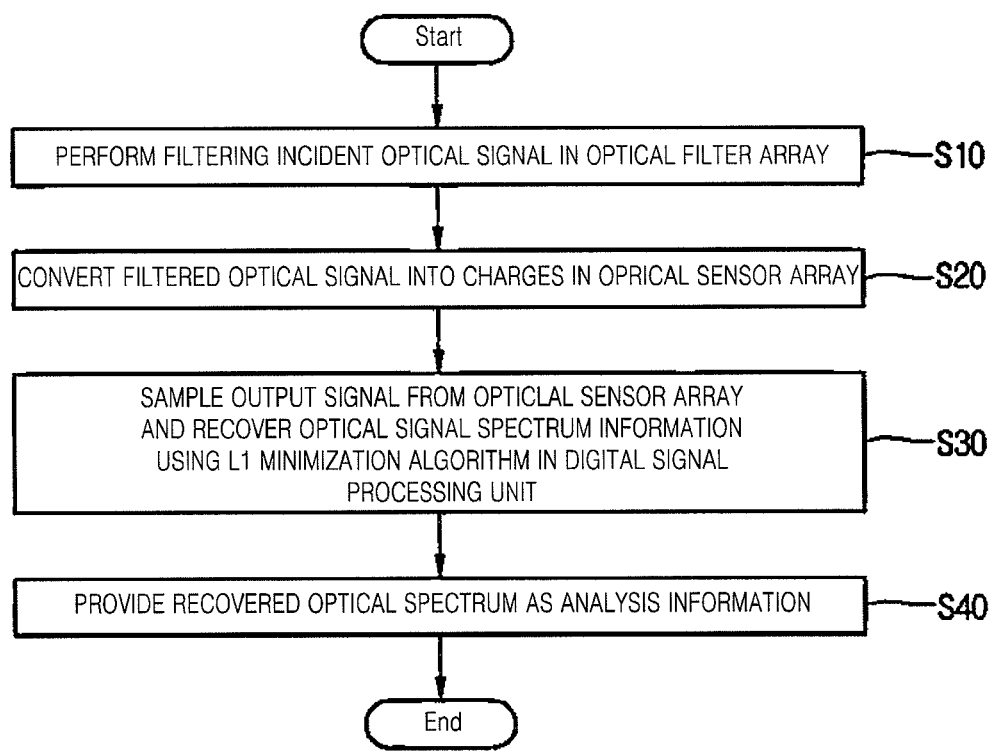
FIG. 2 is a flowchart illustrating an optical signal processing method in a small spectrometer using sparse nature of a signal spectrum in accordance with an exemplary embodiment of the present invention.

FIG. 2 is a flowchart illustrating an optical processing method in a small spectrometer using sparse nature of a signal spectrum in accordance with an exemplary embodiment of the present invention.

Referring to FIG. 2, the optical filter array 110 performs filtering on an input optical signal in operation S10. At this time, each filter configuring the optical filter array 110 transmits only wavelength components of the optical signal in a bandwidth allocated to the filter. Accordingly spectrum information obtained from the optical filter array 110 may include distorted information with the original spectrum information of the optical signal and an optical filter component contained therein.

The optical sensor array 120 converts light filtered by the optical filter array 110 into charges. The digital signal processing unit 140 samples an output signal from the optical sensor array 120 and recovers an optical signal spectrum using an L1 norm minimization algorithm in operation S30.

The digital signal processing unit 140 will be described in detail.

A digital signal processing performed in the digital signal processing unit 140 includes a process for obtaining a solution of a system of underdetermined linear equations. The digital signal processing unit 140 performs a process for obtaining a solution of the system of underdetermined linear equations using the L1 norm minimization algorithm. The process adopting the L1 norm minimization algorithm uses a nature of sparse distribution of the optical signal spectrum information.

The L1 norm minimization algorithm is a recent estimation algorithm using a sparse nature of a signal spectrum.

$x(\lambda)$ represents spectrum components of original light input to the optical filter array 110 at a wavelength $\lambda$. Each element of the optical filter array 110 may be designated in a transfer function type. The transfer function denotes a fraction of light transmitted at a given wavelength $\lambda$.

$f_i(\lambda)$ represents a transfer function of i-th element of the optical filter array 110.

$d(\lambda)$ represents a sensitivity function of the optical sensor array 120, which is assumed to be identical for all of the elements in the optical filter array. $D_i(\lambda_j)$, i=1, 2, . . . M represents a sensitivity function $D_i(\lambda)=d(\lambda)f_i(\lambda)$ of i-th element of the optical filter array 110 at a given wavelength $\lambda$. Each $D_i(\lambda_j)$ is a continuous function of wavelength $\lambda$.

An i-th output $y_i$ of the optical sensor array 120 is given as $y_i = \int D_i(\lambda) x(\lambda) d\lambda + w_i$. Here, $w_i$ is an observation noise or measurement noise.

M samples may be collected from the output from the optical array sensor 120 and arranged into a vector as y, where $y = [y_1 \ldots y_M]^T$.

The output signals from the optical sensor array 120 may be represented as an output vector y. The output vector y may be modeled as the following Equation 1.

$$y = Dx + w \quad \text{Equation (1)}$$

In Equation 1, D denotes a (M×N) sensitivity matrix of the optical sensor array as shown in Equation 2.

$$\begin{bmatrix} D_1(\lambda_1) & D_1(\lambda_2) & \ldots & D_1(\lambda_N) \\ D_2(\lambda_1) & D_2(\lambda_2) & \ldots & D_2(\lambda_N) \\ \vdots & \vdots & \ddots & \vdots \\ D_M(\lambda_1) & D_M(\lambda_2) & \ldots & D_M(\lambda_N) \end{bmatrix} \qquad \text{Equation (2)}$$

Each element of (M×1) vector w may be modeled as a sample from a Gaussian probability distribution having zero-mean and standard deviation $\sigma^2$.

$x=[x_1 \ldots x_N]^T$ represents a signal spectrum vector obtained by sampling the continuous signal spectrum $x(\lambda)$ uniformly at wavelength $\lambda_1, \lambda_2, \ldots, \lambda_N$.

$W_\lambda$ represents a total bandwidth of the signal spectrum $x(\lambda)$.

$$\Delta\lambda_N = \frac{W_\lambda}{N}$$

represents an interval between samples of x.

In Equation 2, a value $D_i(\lambda_j)$ may be obtained by uniformly sampling the sensitivity function of i-th spectral detector array 130 along a wavelength axis.

A conditional number of matrix D may be large because non-ideal transmission functions are arranged along the rows of D.

Accordingly it is necessary to obtain an estimate $\hat{x}$ of signal spectrum x from observation y in a state where the sensitivity matrix D of the spectral detector array 130 is given.

Accuracy of recovery from the signal spectrum estimation may be measured in an aspect of mean square error defined as Equation 3.

$$MSE = \frac{1}{N}\sum_{i=1}^{N}(x_i - \hat{x}_i)^2 \qquad \text{Equation (3)}$$

Here, $x_i$ denotes i-th component of x.

When there is no noise and M≥N, Equation 1 becomes a overdetermined equation. When M<N, Equation 1 becomes an underdetermined equation.

The resolution of the small spectrometer is determined by capability of discriminating spatially adjacent spectrum components. With a given interval $$\Delta\lambda_N = \frac{W_\lambda}{N},$$

an achieved maximum resolution may be defined as $$\Delta\lambda_{max} = \mu_N \Delta\lambda_N = \mu_N \frac{W_\lambda}{N}.$$

Here, $\mu_N$ is given as Equation 4.

$$\mu_N := \min_{\mu \in [1,2,\ldots N-1]} \mu \text{ subject to } MSE \leq \delta \qquad \text{Equation (4)}$$

Here, $\delta>0$ is a user-defined positive value.

When MSE between the recovered signal spectrum and the input signal spectrum is $\delta$ or less, two spectra $\mu_N\Delta\lambda_N$ separated from each other can be said to be resolved. Since an interval between samples is given as $$\Delta\lambda_N = \frac{W_\lambda}{N}$$

for the fixed $W_\lambda$, the interval $\Delta\lambda_N$ decreases as N increases. It is necessary to increase N in order to find the maximum available resolution.

It is also necessary to confirm that all the pairs of two non-zero nearby spectral components of x separated by $\Delta\lambda_N$ from each other and discriminatively resolved with respect to $\mu_N=1$.

For $\mu_N=2$, there is a pair of spectral components separated by $\Delta\lambda_N$ from each other that are not resolved. But some pairs of non-zero spectral components separated by $2\Delta\lambda_N$ from each other can be discriminatively resolved.

In Equation 1, any arbitrary natural signal or a vector x may be expressed as directly sparse signal or sparse signal on a certain basis, namely, x=Ψs. Basis Ψ is an (N×N) matrix called a sparsifying basis, signal s is a K-sparse signal where K components of s are non-zero and the rest of the (N−K) components are zero. Therefore the natural signal is just a linear combination of K rows of matrix Ψ. When Ψ=I (identity matrix) then x=s, such a signal x is directly sparse signal. It is intrinsically sparse.

In Equation 1, the original signal spectrum x may be modeled with a linear combination of K Gaussian kernels, namely, x=Ψs. The reason of using the Gaussian Kernel is that a smooth Gaussian kernel can preserve a smooth characteristic of a signal spectrum. In addition, specification of the Gaussian kernel needs only two parameters, namely, a position and a width. These may be selected according to characteristics of a signal spectrum in a specific application. In order to configure the kernel matrix Ψ, a single Gaussian kernel having an arbitrary FWHM (Full-Width at Half-Maximum) is sampled. The sampled kernel forms a first column of Ψ. The rest of the (N−1) columns of Ψ are just shifted versions of the first column. An interval between samples of the Gaussian kernel is $\Delta\lambda_N$.

Employing a sparse model x=Ψs, Equation 1 may be expressed as Equation 5.

$$y=Dx+w=D\Psi s+w \qquad \text{Equation (5)}$$

Here, the dimension of y is (M×1), the dimension of D is (M×N), M<N, and s is (N×1). An estimate $\hat{s}$ of s may be obtained from y of Equation 5. It is necessary to note that the dimension of y is less than that of the sparse signal s. After a sparse expression, an L1 norm criterion may be employed for uniquely recovering the sparse signal from the measurement vector y.

The L1 norm minimization algorithm improves quality (resolution) of the given recovery signal using prior information. When the fixed number of signals are observed. Exploiting sparse expression of the signal x, s can be uniquely recovered from y. At this time, N unknowns in Equation 5 are necessary to estimate, however only M(<N) measured values of the original spectrum are given. The L1 norm minimization manner may be adopted to find a unique and sparse solution for underdetermined system of linear equations.

A signal model of y=DΨs+w is used. Here s is a K-sparse signal. The best approach is to obtain a sparse vector s consistent with the measurement value y. This leads to solve the L0 norm minimization problem as Equation 6.

$$\hat{s} = \min_{s} \|s\|_0 \text{ subject to } \|D\Psi s - y\|_2 \leq \varepsilon \qquad \text{Equation (6)}$$

Here, operator $\|s\|_0$ counts the number of non-zero components of s and $\varepsilon$ denotes a small positive integer specified by a user.

However Equation 6 is a combinatorial optimization problem known to be intractable by computer operations. Therefore the L1 norm minimization algorithm may provide a tractable solving way to a problem presented in Equation 6.

The L1 norm minimization algorithm for recovery of the sparse signal performed in the digital processing unit 140 may be expressed as Equation 7.

$$\hat{s} = \min_{s} \|s\|_1 \text{ subject to } \|D\Psi s - y\|_2 \leq \varepsilon \qquad \text{Equation (7)}$$

In order to find an optimal estimate ŝ, the L1 norm minimization problem may be generally restructured as a linear program which may obtain a solution efficiently. When designated as A=DΨ, Equation 7 may be deployed as Equation 8.

$$\min_{s} \|s\|_1 + \frac{\lambda}{2}\|As - y\|_2^2 \qquad \text{Equation (8)}$$

Here, $\lambda$ is a non-negative parameter. In Equation 8, the minimization can be constructed as a linear programming problem with a non-negative limitation (s≥0). Here the non-negative limitation (s≥0) means that a signal spectrum is non-negative. This may be expressed Equation 9.

$$\min_{s} l^T s \text{ subject to } \|As - y\|_2^2 \leq \varepsilon, s \geq 0 \qquad \text{Equation (9)}$$

In order to find an optimal signal spectrum estimate, a primal-dual interior point method may be used for solving the linear programming problem.

Figure 3:
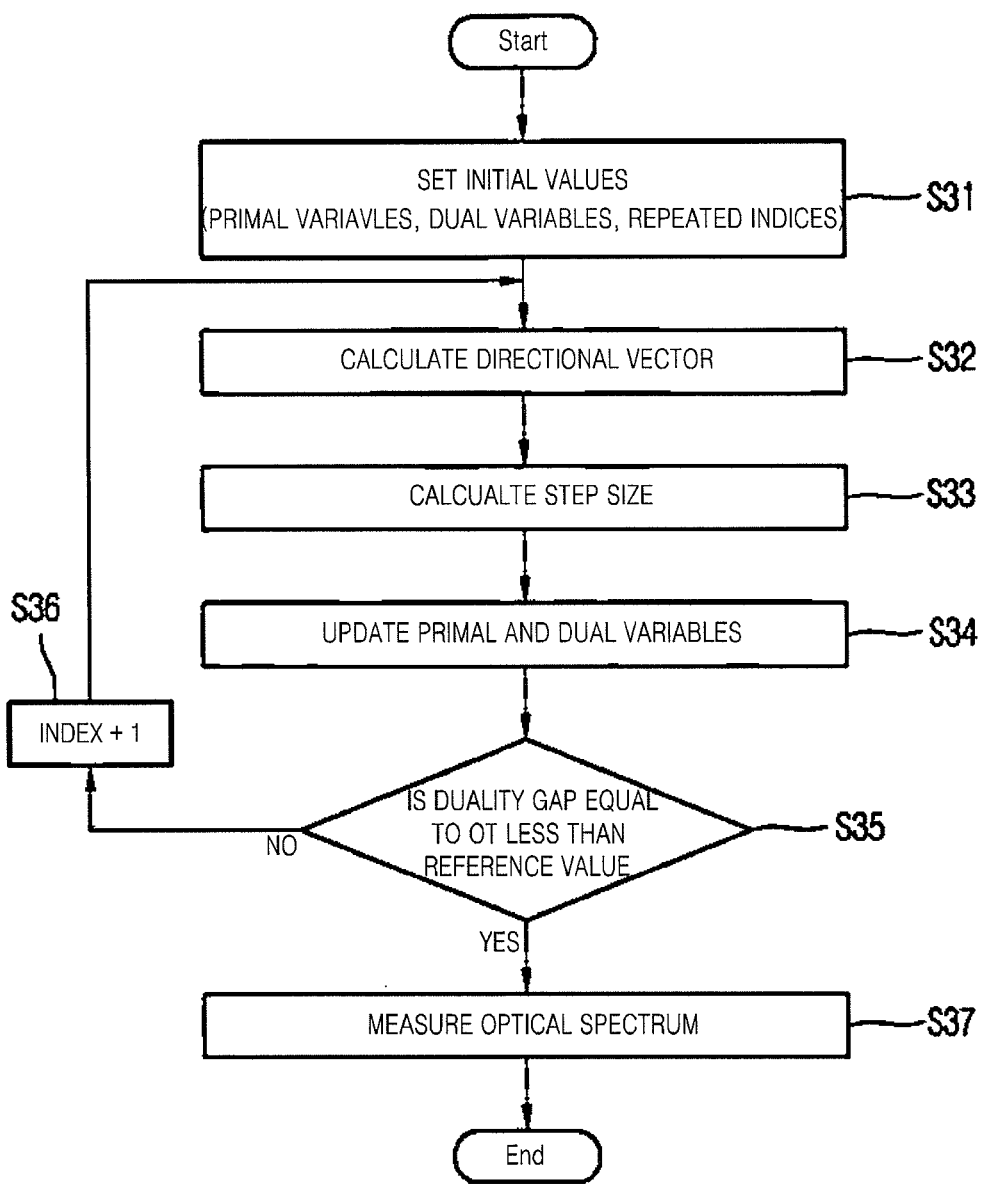
FIG. 3 is a flowchart illustrating an L1 norm minimization algorithm in accordance with an exemplary embodiment of the present invention.

FIG. 3 is a flowchart illustrating an L1 norm minimization algorithm in accordance with to an exemplary embodiment of the present invention.

Referring to FIG. 3, initial values are set according to the L1 norm minimization algorithm in operation S31. The set initial values include a primal variable $s_\lambda^{(k)}$, a dual variable $v_\lambda^{(k)}$, a repeated index k.

Directional vectors are calculated in operation S32. The (k−1)th directional vectors $\Delta s_\lambda^{(k)}$, $\Delta v_\lambda^{(k)}$ are obtained as the following Equation 10.

$$\Delta s_\lambda^{(k-1)} = \qquad \text{Equation (10)}$$
$$\left[(s^{(k-1)})^{-1} v^{(k-1)} + \lambda A^T A\right]^{-1} [\lambda A^T(y - As_\lambda^{(k-1)}) - 1_N]$$
$$\Delta v_\lambda^{(k-1)} = \lambda \left(A^T A \Delta s_\lambda^{(k-1)} - A^T(y - As_\lambda^{(k-1)})\right) - s_\lambda^{(k-1)} + 1_N.$$

$$\text{Here, } S^{(k)} = \begin{bmatrix} s_{\lambda,1}^{(k)} & 0 & 0 \\ 0 & \ddots & 0 \\ 0 & 0 & s_{\lambda,N}^{(k)} \end{bmatrix}, V^{(k)} = \begin{bmatrix} v_{\lambda,1}^{(k)} & 0 & 0 \\ 0 & \ddots & 0 \\ 0 & 0 & v_{\lambda,N}^{(k)} \end{bmatrix},$$

$s_{\lambda,i}^{(k)}$ is an i-th element of vector $s_\lambda^{(k)}$, $v_{\lambda,i}^{(k)}$ is an i-th element of vector $v_\lambda^{(k)}$. First, a directional vector $\Delta s_\lambda^{(k-1)}$ of the primal variable is found, and then a directional vector $\Delta v_\lambda^{(k-1)}$ of the dual variable is found.

In operation S33, a step size is calculated. The step size may be basically calculated using a backtracking line search technique used in an optimization theory. For an efficient calculation of the step size, it is preferable to calculate an initial step size properly. The initial step size is determined by Equation 11.

$$\alpha_0^{(k-1)} = 0.99 \times \min(\alpha_1, \alpha_2) \qquad \text{Equation (11)}$$

$$\text{Here, } \alpha_1 = \min_{i \in \{i: \Delta s_{\lambda,i}^{(k-1)} < 0\}} |s_{\lambda,i}^{(k-1)} / \Delta s_{\lambda,i}^{(k-1)}|, \text{ and}$$

$$\alpha_2 = \min_{i \in \{i: \Delta v_i^{(k)} < 0\}} |v_{\lambda,i}^{(k-1)} / \Delta v_{\lambda,i}^{(k-1)}|.$$

Once the initial step size is determined, a (k−1)-th step size $\alpha^{(k-1)}$ satisfying Equation 12 is obtained.

$$\|F_\lambda(s_\lambda^{(k-1)}, v_\lambda^{(k-1)})\|_2^2 > \|F_\lambda(s_\lambda^{(k-1)} + \alpha^{(k-1)} \Delta s_\lambda^{(k-1)}, v_\lambda^{(k-1)} + \alpha^{(k-1)} \Delta v_\lambda^{(k-1)})\|_2^2 \qquad \text{Equation (12)}$$

In operation S34, primal and dual variables are updated. The k-th primal and dual variables are updated with Equation 13.

$$s_\lambda^{(k)} = s_\lambda^{(k-1)} + \alpha^{(k-1)} \Delta s_\lambda^{(k-1)}$$
$$v_\lambda^{(k)} = v_\lambda^{(k-1)} + \alpha^{(k-1)} \Delta v_\lambda^{(k-1)} \qquad \text{Equation (13)}$$

Then whether a duality gap is equal to or less than a reference value is determined In operation S35. The duality gap is expressed as the following Equation 14.

$$\eta = |Q_{Primal}(x_\lambda; \lambda) - Q_{dual}(s; \lambda)| = |s^T(-x_\lambda)| \qquad \text{Equation (14)}$$

According to the determination result, when the duality gap is larger than the reference value, the index is increased by 1 and $\lambda = \lambda_\rho$ (here, $\rho > 0$) is performed in operation S36. Then operations S32 to S34 are repeatedly performed.

According to the determination result, when the duality gap is equal to or less than the reference value, the estimate is output as the optical spectrum estimate in operation S37.

According to exemplary embodiments of the present invention, a digital signal processing is performed for recovering original spectrum information of an optical signal from a distorted optical spectrum signal acquired through an optical array filter and an optical sensor array in a spectrometer. A process is applied to this optical signal processing, which obtains a solution of insufficient linear equations using the L1 norm minimization on the basis of the sparse nature of the optical signal spectrum.

Therefore resolution can be remarkably improved, which is achievable by an optical filter array in a small spectrometer which is limited in the number of the optical filters configuring the optical filter array.

Although the method and an apparatus for processing an optical signal in a spectrometer using sparse nature of signals have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:
1. An apparatus for processing an optical signal of a spectrometer using sparse nature of a signal spectrum, the apparatus comprising:
an optical filter array configured to filter an incident light having N non-zero spectrum components, each component separated by an interval ($\Delta\lambda_N$);

an optical sensor array configured to convert the filtered light into charges;

a digital signal processing unit configured to perform a digital signal processing on an output from the optical sensor array based on an L1 norm minimization algorithm using sparse nature of a signal spectrum and recover spectrum information of the incident light, the digital signal processing unit further configured to discriminatively decompose the non-zero spectrum components separated by $\Delta\lambda_{max}=\mu_N\Delta\lambda_N$, when the spectrum information of the incident light is recovered, where $\Delta\lambda_{max}$ is an achieved maximum resolution and $$\mu_N := \min_{\mu \in \{1,2,\ldots,N-1\}} \mu \text{ subject to } MSE \leq \delta,$$

where MSE represents mean square error and $\delta$ is a user-defined positive value; and a separate analysis information providing unit to provide the recovered spectrum information of the incident light in a graph or other analysis information.

2. The apparatus of claim 1, wherein the digital signal processing unit is implemented as a Digital Signal Processing chip.

3. The apparatus of claim 1, wherein the L1 norm minimization algorithm comprises a process which models underdetermined linear equations of primal and dual variables, and calculates a unique solution from the modeled insufficient linear equations of the dual variables.

4. The apparatus of claim 3, wherein the insufficient linear equations of dual variables are for a sparse signal of the output from the optical sensor array and have a non-negative limitation.

5. The apparatus of claim 1, wherein the L1 norm minimization algorithm comprises a process which sets initial values of primal variables, dual variables and repeated indices, wherein repeated indices refers to a quantity indicative of the number of iterations the process executes, calculates directional vectors, calculates a step size, updates the primal and dual variables, and determines whether a duality gap is equal to or less than a reference value, repeats increasing an index by 1 and calculating a directional vector or updating the primal and dual variables when the duality gap is larger than the reference value, or outputs an estimate as an optical spectrum estimation value when the duality gap is equal to or less than the reference value.

6. A method of processing an optical signal of a spectrometer using sparse nature of a signal spectrum, the method comprising:

filtering an incident light, having N non-zero spectrum components with each component separated by an interval ($\Delta\lambda_N$), using an optical filter array;

converting the filtered light into charges using an optical sensor array and outputting the converted charges;

performing a digital signal processing on an output from the optical sensor array based on an L1 norm minimization algorithm using sparse nature of a signal spectrum through a digital signal processing unit and recovering spectrum information of the incident light, the digital signal processing unit configured to discriminatively decompose the non-zero spectrum components separated by $\Delta\lambda_{max}=\mu_N\Delta\lambda_N$ when the spectrum information of the incident light is recovered, where $\Delta\lambda_{max}$ is an achieved maximum resolution and $$\mu_N := \min_{\mu \in \{1,2,\ldots,N-1\}} \mu \text{ subject to } MSE \leq \delta,$$

where MSE represents mean square error and $\delta$ is a user-defined positive value; and providing the recovered spectrum information of the incident light in a graph or other analysis information using a separate analysis information providing unit.

7. The method of claim 6, wherein the L1 norm minimization algorithm comprises a process which models insufficient linear equations of primal variables and its corresponding dual variables, and calculates a unique solution from the modeled insufficient linear equations of the dual variables.

8. The method of claim 7, wherein the insufficient linear equations of dual variables are for a sparse signal of the output from the optical sensor array and have a non-negative limitation.

9. The method of claim 6, wherein the L1 norm minimization algorithm comprises a process which sets initial values of primal variables, dual variables and repeated indices, wherein repeated indices refers to a quantity indicative of the number of iterations the process executes, calculates directional vectors, calculates a step size, updates the primal and dual variables, and determines whether a duality gap is equal to or less than a reference value, repeats increasing an index by 1 and calculating a directional vector or updating the primal and dual variables when the duality gap is larger than the reference value, or outputs an estimate as an optical spectrum estimation value when the duality gap is equal to or less than the reference value.

10. The apparatus of claim 1, wherein the optical sensor array is directly connected to the digital signal processing unit.

* * * * *